United States Patent [19]

Hansen

[11] Patent Number: 4,728,452

[45] Date of Patent: Mar. 1, 1988

[54] METAL CORROSION INHIBITION IN CLOSED COOLING SYSTEMS

[75] Inventor: Gerald D. Hansen, Holicong, Pa.

[73] Assignee: Pony Industries, Inc., New York, N.Y.

[21] Appl. No.: 819,649

[22] Filed: Jan. 17, 1986

[51] Int. Cl.⁴ .............................................. C09K 5/00
[52] U.S. Cl. ................................ 252/75; 252/49.3; 252/387; 252/389.54; 252/389.62; 422/7; 422/16; 422/19
[58] Field of Search .......... 252/49.3, 75, 387, 389.54, 252/389.62; 422/7, 16, 19

[56] References Cited

U.S. PATENT DOCUMENTS

| | | | |
|---|---|---|---|
| 2,147,395 | 2/1939 | Bayes | 252/389.54 |
| 3,335,096 | 8/1967 | Hatch | 252/387 |
| 4,098,720 | 7/1978 | Hwa | 252/387 |
| 4,149,969 | 4/1979 | Robitaille et al. | 252/181 |
| 4,452,715 | 6/1984 | Hirozawa | 252/75 |
| 4,548,787 | 10/1985 | Wilson et al. | 252/181 |
| 4,561,990 | 12/1985 | Darden | 252/75 |

OTHER PUBLICATIONS

Zucker, "Prevention of Corrosion Failures in Electrical Equipment", Proc. Tech. Assoc., Pulp Pap. Ind., 1982 (Eng. Conf. Bk. 2), 457–460.

*Primary Examiner*—Robert Wax
*Attorney, Agent, or Firm*—J. R. Magnone; A. J. Good

[57] ABSTRACT

The corrosion of metals in closed, aqueous cooling systems having a pH of 7.5 to 10.5 is inhibited by adding to the system a coolant concentrate comprising water, at least 10% by weight of a water soluble nitrite or a mixture of a water soluble nitrite and a water soluble nitrate, 0.2 to 2.0% by weight of at least one water soluble azole, and 0.1 to 1.0% by weight of a water soluble molybdate, to provide in the system concentrations of at least 200 ppm of the nitrite or nitrite/nitrate mixture, 2 to 20 ppm of the azole and 1 to 10 ppm of the molybdate.

8 Claims, No Drawings

METAL CORROSION INHIBITION IN CLOSED COOLING SYSTEMS

BACKGROUND OF THE INVENTION

This invention relates to the inhibition of metal corrosion in closed cooling systems, particularly closed systems in which aqueous coolants recirculate, such as engines, compressors and industrial process loops.

Closed recirculating cooling systems have various advantages over open cooling systems. For example, because little coolant evaporation occurs in closed systems, coolant makeup requirements are minimal. Furthermore, coolant temperatures are more easily controlled, the systems are less susceptible to biological fouling, and scale deposits are virtually eliminated. Most significantly, the absence of the continual saturation with oxygen usually encountered in open systems greatly reduces metal corrosion in closed systems. Nevertheless, closed coolant systems that are vented still suffer from metal corrosion from oxygen which enters the system at the surface of surge tanks, hot wells, and other points, or which enters as dissolved oxygen. However, the corrosion caused by dissolved oxygen is, in vented closed systems, reduced at higher operating temperatures because of the decreased solubility of oxygen at such temperatures. In completely closed systems, lacking provision for venting oxygen to the atmosphere, increased coolant temperature will increase corrosion by dissolved oxygen.

Coolants in contact with aluminum or bimetallic couples present additional problems due to greatly accelerated corrosion of aluminum above pH 8.0 and the very high concentrations of inhibitors, such as chromates, required to offset bi-metallic influences. Nitrites, nitrates, azole compounds and molybdates, individually and in certain admixtures, are known as corrosion inhibitors in aqueous compositions which contact metallic surfaces. For example, U.S. Pat. No. 4,313,837 to Vukasovich et al. discloses a water-based metal working fluid containing as a corrosion inhibitor a mixture of a molybdate and various other ingredients including a nitrite. U.S. Pat. No. 4,349,457 to Orillion discloses a resin-based coating composition containing a corrosion inhibitor comprising a mixture of borate, nitrite, and molybdate salts.

Similar corrosion inhibitor mixtures are also known for use in recirculating aqueous coolants, such as a mixture of a molybdate, a surfactant, a polyphosphate and an azole in U.S. Pat. No. 4,176,059 to Suzuki. A combination of silicate, phosphate, borate, nitrate, azole and alkali compounds in antifreeze compositions is disclosed in U.S. Pat. No. 4,455,248 to Wood. U.S. Pat. No. 3,948,792 to Watson et al. discloses corrosion and scale-softening compositions for use in engine coolants, combining azoles and nitrites with various other ingredients including nitrates, silicates, borates, pH adjusting agents and polymeric dispersants. A combination of molybdate, azole and nitrate along with other ingredients is disclosed in U.S. Pat. No. 4,149,969 to Robitaille et al. for use in coolants and a combination of nitrate or nitrite with an azole and a molybdate is disclosed in U.S. Pat. No. 4,452,715 to Hirozawa.

The foregoing patents concerned with metal corrosion inhibited coolants and molybdate as an inhibitor, require high concentrations of nitrite, nitrate, and/or molybdate, high relative proportions of other corrosion inhibiting ingredients or are limited in the cooling systems and metals which they can protect at high pH (about 8.0 to 10.5). Thus, the Hirozawa patent discloses, in Table II, a complex inhibitor mixture in an antifreeze concentrate totalling about 100–110 parts by weight, wherein the amounts of nitrate, azole and molybdate are 0.3, 0.25, and 0.01 parts by weight, respectively. The Robitaille et al patent teaches a wide variety of corrosion inhibitor systems for coolants used in open systems such as recirculating cooling towers and the like. The inhibitors include molybdate in a use-concentration of at least about 1 ppm to as high as 100 ppm, preferably about 2 to 10 ppm, in admixture with a divalent metal salt (the anion of which may be nitrate) at a cation concentration of about 0.5 to about 5 ppm and an azole such as 2-mercaptobenzothiazole, benzotriazole, and tolyltriazole at concentrations of about 1 to about 5 ppm or higher. The compositions appear to be effective for control of corrosion of ferrous, copper and copper alloy surfaces, but the patent is silent with respect to aluminum surfaces particularly under alkaline conditions.

SUMMARY OF THE INVENTION

It has now been found that corrosion of metal surfaces of closed cooling systems can be effectively inhibited under alkaline conditions by incorporating into the coolant an essentially dry inhibitor composition comprising at least 10 parts by weight of a water soluble nitrite or a mixture of a water soluble nitrite and a water soluble nitrate, 0.2 to 2.0 parts by weight of at least one water soluble azole, and 0.1 to 1.0 parts by weight of a water soluble molybdate.

In another aspect of the invention, a metal corrosion inhibited aqueous coolant concentrate is provided containing as inhibitors, at least 10% by weight of a water soluble nitrite or a mixture of a water soluble nitrite and a water soluble nitrate, 0.2 to 2.0% by weight of at least one water soluble azole, and 0.1 to 1.0% by weight of a water soluble molybdate.

In still another aspect of the invention, the foregoing concentrate, containing water alone or water in admixture with freezing point depressing amounts of at least one alcohol, at least one glycol or a mixture of at least one alcohol and at least one glycol, is added to a closed, aqueous cooling system to provide use-concentrations of the inhibitors of at least 100 parts per million (ppm) of the nitrite or mixture of nitrite and nitrate, 2 to 20 ppm of azole, and 1 to 10 ppm of molybdate.

The inhibitor mixtures provide effective control of corrosion of aluminum as well as steel and copper surfaces of the cooling systems, even in high alkaline conditions such as pH ranging from about 7.5 to 10.5. The effectiveness of the corrosion inhibitor mixtures at the relatively low proportions of molybdate to nitrite, or mixture of nitrite and nitrate, is a particularly outstanding feature of the invention.

DETAILED DESCRIPTION

The nitrite and nitrate components must be water soluble and therefore alkali metal nitrites and nitrates are preferred, particularly the sodium salts. When a mixture of nitrite and nitrate is employed, the nitrite will comprise at least 50% by weight of the mixture, such as 50 to about 95% by weight. The nitrite or nitrite/nitrate mixture will comprise at least 10 wt.% of the aqueous coolant concentrate, the upper limit being dictated only by the economics of the treatment. A preferred range is 10 wt.% to about 50 wt.%, more preferably about 15 to 25 wt.%.

The water soluble azoles includes thiazoles, triazoles, salts thereof, such as the alkali metal salts, and any mixture of two or more thereof. Typical azoles include 2-mercaptobenzothiazole, 1,2,3-benzotriazole, tolyltriazole, and the sodium salts thereof. Sodium tolyltriazole is the preferred azole. The azole component will comprise 0.2 to 2.0% by weight of the coolant concentrate, preferably 0.2 to 1.0 wt.%. The azole can be added in the acid form, the salt thereof being subsequently formed by addition of base.

The molybdate component of the inhibitor likewise must be water soluble and therefore alkali metal salts of molybdates are preferred, such as sodium molybdate, the dihydrate being particularly preferred. Generally, 0.1 to 1.0 wt.% of the molybdate may be used in the coolant concentrate.

In place of an aqueous concentrate of the coolant composition, the inhibitor components may be formed as a dry blend to which water may be added to form the concentrate, or the dry blend may be added directly to an aqueous coolant system in sufficient parts by weight to provide proportions corresponding to those of the aqueous concentrate and use amounts of at least 100 ppm and up to about 600 ppm, preferably 200 to 500 ppm, of the nitrate, or mixture of nitrite and nitrate, 2 to 20 ppm of the azole, and 1 to 10 ppm of the molybdate.

The coolant concentrate may be totally aqueous or may contain freezing point depressing amounts of at least one alcohol, at least one glycol, or mixtures of one or more alcohol and glycol. The alcohol, glycol or alcohol-glycol mixture may comprise about 20% to 90% by weight of the aqueous concentrate, preferably about 40% to 60% by weight. Any of the water soluble alcohols and glycols known in the antifreeze coolant art may be used, including methanol, ethanol, propanol, ethylene glycol, propylene glycol, diethylene glycol, dipropylene glycol, triethylene glycol, glycerol, and glycol ethers of various types. Mixtures of ethylene glycol and diethylene glycol are particularly preferred.

To the inhibitors in the aqueous concentrate, or to the coolant in the closed cooling system, may optionally be added other reagents known for use in cooling systems. For example, pH adjusting or controlling compounds may be added, such as basic and acidic compounds, e.g., NaOH, KOH or NH$_4$OH, and mineral or organic acids, e.g., HCl, H$_2$SO$_4$ or acetic acid, or buffering agents such as borates, to maintain the pH in the range of about 8.0 to 10.5.

Anionic dispersants may be added to the aqueous coolant concentrate or to the coolant in the cooling system for the purpose of dispersing solids which may be present or generated in the cooling system. Particularly effective dispersants are the water soluble salts of dialkyl esters of sulfosuccinic acid, water soluble, low molecular weight (about 500 to 5,000 number average molecular weight) carboxylic vinyl polymers, and mixtures thereof. Representative sulfosuccinates are sodium dioctyl sulfosuccinate, sodium dihexyl sulfosuccinate and the like. Representative carboxylic vinyl polymer dispersants include polyacrylic acid terminated by thioglycolic, sulfato or mercapto groups, such as disclosed in U.S. Pat. No. 4,384,979 to Hansen, and hydrolyzed styrene-maleic anhydride polymers and hydrolyzed sulfonated styrene-maleic anhydride polymers such as disclosed in U.S. Pat. Nos. 2,723,956; 3,948,792; 4,289,327; and 4,374,733. The disclosures of the foregoing patents are incorporated herein by reference. The dispersants may be used singly or in combination, a preferred combination being a mixture of polyacrylic acid terminated by thioglycolic acid and sodium dioctyl sulfosuccinate. Any amounts of dispersants effective for preventing deposition of solids on the metal surfaces of the cooling system may be used, for example, from about 0.01 to about 10% by weight based on total coolant concentrate, such amounts being diluted upon addition of the concentrate to the cooling system. The coolants may also be formulated with water soluble silicates as buffering agents, and with solubilizers for scale-forming metal salts and hydroxides, such as tartaric acid. Other corrosion inhibitors may also be present, such as phosphates, organo phosphonates, phosphate esters, and the like including combinations thereof.

The inhibitor composition is effective in low to moderate hardness waters (about 10 to 200 ppm calcium ion) and air or oxygen need not be excluded from the cooling system (although exclusion may be useful in systems where it is desired to prevent bio-oxidation of nitrite to nitrate).

The following examples are intended as further illustration of the invention but not as limitations on the scope thereof.

EXAMPLE 1

Sodium tolyltriazole, 2 ppm, sodium molybdate (dihydrate), 2 ppm, and sodium nitrite, in amounts ranging from 100 to 250 ppm, were added to tap water in a corrosion cell and tested for ability to inhibit corrosion of mild steel at pH 8.0 to 10.0 in the absence of air and analyzed by Tafel Plots as described in Application Note 148, Princeton Applied Research Corporation publication No. AN148-10M-5/78-CP (1978). The results, reported below in Table I as corrosion rates in milli-inches per year (mpy), indicate good corrosion control under the test conditions. By comparison, untreated systems (mild steel) exhibit corrosion rates of about 20 mpy and corrosion rates of 1–3 mpy in systems (mild steel) treated by other chemicals are considered good levels of inhibition.

TABLE I

| Nitrite, | Corrosion of mild steel, Tafel Plot (mpy) | | | | | |
|---|---|---|---|---|---|---|
| | pH 8.0 | | pH 9.0 | | pH 10.0 | |
| ppm | Anode | Cathode | Anode | Cathode | Anode | Cathode |
| 100 | 0.130 | 0.130 | 0.117 | 0.116 | 0.488 | 0.395 |
| 150 | 0.094 | 0.056 | 0.056 | 0.092 | 0.226 | 0.270 |
| 200 | 0.103 | 0.088 | 0.092 | 0.041 | 0.086 | 0.084 |
| 250 | 0.062 | 0.087 | 0.083 | 0.076 | 0.087 | 0.085 |

EXAMPLE 2

Essentially as described in Example 1, corrosion rates on mild steel were determined under the same conditions except that the base solution was 40% by weight ethylene glycol and 60% by weight tap water. The results are given in Table II.

TABLE II

| Nitrite, | Corrosion of mild steel, Tafel Plot (mpy) | | | | | |
|---|---|---|---|---|---|---|
| | pH 8.0 | | pH 9.0 | | pH 10.0 | |
| ppm | Anode | Cathode | Anode | Cathode | Anode | Cathode |
| 100 | — | — | 0.084 | 0.073 | — | — |
| 150 | 0.098 | 0.080 | 0.099 | 0.043 | 0.095 | 0.090 |
| 200 | 0.098 | 0.075 | 0.085 | 0.064 | 0.043 | 0.073 |

TABLE II-continued

| Nitrite, | Corrosion of mild steel, Tafel Plot (mpy) | | | | | |
|---|---|---|---|---|---|---|
| | pH 8.0 | | pH 9.0 | | pH 10.0 | |
| ppm | Anode | Cathode | Anode | Cathode | Anode | Cathode |
| 250 | — | — | 0.087 | 0.071 | — | — |

EXAMPLE 3

Essentially as described in Example 1, corrosion rates on mild steel and copper were determined under the same conditions except that the base solution was filtered tap water, air was not excluded, the concentration of the sodium molybdate was 10 ppm and the concentration of the sodium tolyltriazole was 8 ppm. The results are given in Tables IIIA and IIIB below.

TABLE IIIA

| Nitrite, | Corrosion of mild steel, Tafel Plot (mpy) | | | | | |
|---|---|---|---|---|---|---|
| | pH 8.0 | | pH 9.0 | | pH 10.0 | |
| ppm | Anode | Cathode | Anode | Cathode | Anode | Cathode |
| 150 | 0.048 | 0.056 | 0.031 | 0.047 | 0.074 | 0.137 |
| 200 | 0.095 | 0.095 | 0.071 | 0.035 | 0.044 | 0.072 |
| 250 | 0.062 | 0.034 | 0.052 | 0.063 | 0.010 | 0.022 |

TABLE IIIB

| Nitrite, | Corrosion of copper, Tafel Plot (mpy) | | | | | |
|---|---|---|---|---|---|---|
| | pH 8.0 | | pH 8.5 | | pH 9.0 | |
| ppm | Anode | Cathode | Anode | Cathode | Anode | Cathode |
| 150 | 0.002 | 0.002 | 0.002 | 0.002 | 0.000 | 0.001 |
| 200 | 0.004 | 0.003 | 0.001 | 0.001 | 0.001 | 0.001 |
| 250 | 0.001 | 0.003 | 0.002 | 0.001 | 0.005 | 0.012 |

EXAMPLE 4

Essentially as described in Example 1, corrosion rates on mild steel and aluminum were determined under the same conditions except that the base solution was filtered tap water, air was not excluded, the concentration of the molybdate was 10 ppm, and the concentration of the tolyltriazole was 8 ppm. The results are given in Tables IVA and IVB.

TABLE IVA

| Nitrite, | Corrosion of mild steel, Tafel Plot (mpy) | | | | | |
|---|---|---|---|---|---|---|
| | pH 8.0 | | pH 8.5 | | pH 9.0 | |
| ppm | Anode | Cathode | Anode | Cathode | Anode | Cathode |
| 150 | 0.063 | 0.033 | 0.209 | 0.188 | 0.088 | 0.091 |
| 200 | 0.178 | 0.045 | 0.066 | 0.054 | 0.002 | 0.039 |
| 250 | 0.027 | 0.040 | 0.024 | 0.028 | 0.015 | 0.067 |

TABLE IVB

| Nitrite, | Corrosion of aluminum, Tafel Plot (mpy) | | | | | |
|---|---|---|---|---|---|---|
| | pH 8.0 | | pH 8.5 | | pH 9.0 | |
| ppm | Anode | Cathode | Anode | Cathode | Anode | Cathode |
| 150 | 0.008 | 0.006 | 0.062 | 0.066 | 0.084 | 0.122 |
| 200 | 0.013 | 0.037 | 0.027 | 0.055 | 0.009 | 0.027 |
| 250 | 0.006 | 0.005 | 0.154 | 0.145 | 0.080 | 0.055 |

EXAMPLE 5

Essentially as described in Example 1, corrosion rates on mild steel and aluminum were determined under the same conditions except that air was not excluded, a 90/10 mixture of sodium nitrite and sodium nitrate was used in place of the nitrite alone, and the mixture tested at 150–250 ppm, the concentration of molybdate was 10 ppm and the concentration of triazole was 8 ppm. Table VA and VB give the results.

TABLE VA

| Nitrite/Ni- | Corrosion of mild steel, Tafel Plot (mpy) | | | | | |
|---|---|---|---|---|---|---|
| | pH 8.0 | | pH 8.5 | | pH 9.0 | |
| trate, ppm | Anode | Cathode | Anode | Cathode | Anode | Cathode |
| 150 | 0.075 | 0.070 | 0.002 | 0.043 | 0.127 | — |
| 200 | 0.017 | 0.041 | 0.031 | 0.028 | — | — |
| 250 | 0.020 | 0.066 | — | — | — | — |

TABLE VB

| Nitrite/Ni- | Corrosion of aluminum, Tafel Plot (mpy) | | | | | |
|---|---|---|---|---|---|---|
| | pH 8.0 | | pH 8.5 | | pH 9.0 | |
| trate, ppm | Anode | Cathode | Anode | Cathode | Anode | Cathode |
| 150 | 0.015 | 0.022 | 0.001 | 0.001 | 0.011 | 0.011 |
| 200 | 0.002 | 0.003 | 0.004 | — | 0 | — |
| 250 | 0.001 | 0.001 | — | — | — | — |

EXAMPLE 6

Tafel Plot measurements were made essentially as described in Example 1 except that concentrations of inhibitors representative of Example 1 in Table II in U.S. Pat. No. 4,452,715 to Hirozawa were compared with an inhibitor composition containing concentrations of molybdate within the scope of the present invention. The base solution was an ethylene glycol/diethylene glycol mixture, 98.86/2.5 by weight. As indicated in Example 1 of the patent, sodium nitrate was used in place of the sodium nitrite of the present invention. The results are given in Table VI for pH 9 from which it will be noted that even at the high concentrations of nitrate and mercaptobenzothiazole (MBT), and the high proportions of nitrate and thiazole to molybdate, greatly decreasing the molybdate below 100 ppm (representative of the 0.01 parts by weight of the patent) does not appreciably change the corrosion rate. Accordingly, the data indicates a tenfold improvement as between the 100 ppm and 10 ppm molybdate concentrations since the corrosion rate remained essentially unchanged although the molybdate concentration was decreased tenfold. The 0.016 corrosion rate result is somewhat anomalous and probably reflects the effect of the extraordinarily high concentration of triazole rather than the effect of the molybdate.

TABLE VI

| | Corrosion of mild steel, Tafel Plot (mpy) | | | |
|---|---|---|---|---|
| | Concentration, ppm | | | |
| Molybdate | 100 | 50 | 20 | 10 |
| Nitrate | 3000 | 3000 | 3000 | 3000 |
| MBT | 2500 | 2500 | 2500 | 2500 |
| Corrosion Rate (mpy) | 0.027 | 0.016 | 0.031 | 0.020 |

I claim:
1. A metal corrosion inhibited coolant composition, comprising:
 (1) a water-soluble nitrite or a mixture of a water-soluble nitrite and a water-soluble nitrate, a water-soluble azole selected from triazoles, thiazoles and mixtures of these and a water-soluble molybdate,
 (2) sufficient dilution water to provide from about 200 to about 500 ppm of nitrite or mixture of nitrite and nitrate, from about 2 to about 8 ppm azole and from about 2 to about 10 ppm molybdate, and (3) a buffer present in said composition in an amount sufficient to maintain the pH of said composition to between about 7.5 and 10.5;

wherein said composition is silicate-free.

2. The coolant composition of claim 1 additionally containing a freezing point depressing amount of at least one alcohol, at least one glycol or a mixture thereof.

3. The coolant composition of claim 2 wherein the alcohol, glycol or mixed alcohol-glycol component comprises about 40% to 80% by weight of the coolant.

4. The coolant composition of claim 1 wherein the nitrite is sodium nitrite, the nitrate is sodium nitrate, the azole is sodium tolyltriazole, sodium mercaptobenzothiazole or a mixture thereof, and the molybdate is sodium molybdate.

5. In a process for inhibiting the corrosion of metals in constant contact with an aqueous coolant, the improvement wherein said aqueous coolant comprises the composition of claim 1.

6. In a process for inhibiting the corrosion of metals in constant contact with an aqueous coolant, the improvement wherein said aqueous coolant comprises the composition of claim 4.

7. A cooling system comprising the metal corrosion inhibited coolant composition of claim 1, and an apparatus for containing and transporting said composition, wherein said apparatus includes a metal surface in contact with said composition.

8. The cooling system of claim 7, wherein said metal surface includes aluminum.

* * * * *